(12) United States Patent
Goyal et al.

(10) Patent No.: US 12,543,207 B2
(45) Date of Patent: Feb. 3, 2026

(54) SYSTEM AND METHOD FOR MANAGING BEAM FAILURE RECOVERY IN HIGH-FREQUENCY COMMUNICATION SYSTEMS USING RIS

(71) Applicant: SAMSUNG ELECTRONICS CO., LTD., Suwon-si (KR)

(72) Inventors: Ankur Goyal, Bangalore (IN); Anusha Gunturu, Bangalore (IN); Mohammed Saquib Noorulhuda Khan, Bangalore (IN); Ashok Kumar Reddy Chavva, Bangalore (IN); Hari Krishna Boddapati, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 244 days.

(21) Appl. No.: 18/238,239

(22) Filed: Aug. 25, 2023

(65) Prior Publication Data
US 2024/0073938 A1    Feb. 29, 2024

Related U.S. Application Data

(63) Continuation of application No. PCT/KR2023/012252, filed on Aug. 18, 2023.

(30) Foreign Application Priority Data

Aug. 26, 2022   (IN) .............................. 202241048856
Jul. 6, 2023    (IN) .............................. 202241048856

(51) Int. Cl.
*H04W 72/54*   (2023.01)
*H04B 7/04*    (2017.01)
(Continued)

(52) U.S. Cl.
CPC ............ *H04W 72/54* (2023.01); *H04W 76/27* (2018.02)

(58) Field of Classification Search
CPC ..... H04W 72/54; H04W 76/27; H04W 16/28; H04B 7/04013; H04B 7/0632; H04B 7/06964
See application file for complete search history.

(56) References Cited

U.S. PATENT DOCUMENTS

| | | | |
|---|---|---|---|
| 2019/0174337 A1 | 6/2019 | Prasad et al. | |
| 2020/0099437 A1 | 3/2020 | Harada et al. | |

(Continued)

FOREIGN PATENT DOCUMENTS

| | | | |
|---|---|---|---|
| CN | 113727363 A | 11/2021 | |
| CN | 113746520 B | 2/2022 | |

(Continued)

OTHER PUBLICATIONS

Haustein et al., "Reconfigurable Intelligent Surface Deployment in 5G and Beyond 5G Cellular Networks"; 2022 IEEE 23rd International Workshop on Signal Processing Advances in Wireless Communication, Jul. 28, 2022, Total 5 pages.

(Continued)

*Primary Examiner* — Harry H Kim
(74) *Attorney, Agent, or Firm* — Sughrue Mion, PLLC

(57) ABSTRACT

A method of beam failure recovery managed by a transmitter of a communication system, includes: detecting a first occurrence of a beam failure between the transmitter and a receiver; based on the detection of the first occurrence of the beam failure, identifying at least one first reconfigurable intelligent surface (RIS) for transmitting at least one reference signal; transmitting the at least one reference signal to the at least one first RIS; receiving, from the at least one first RIS, a receiver feedback for the at least one of reference (Continued)

signal; generating an RIS candidate beam list based on the receiver feedback; and transmitting, to the receiver via the at least one first RIS, a radio resource control (RRC) message including the RIS candidate beam list as a beam failure recovery configuration.

9 Claims, 18 Drawing Sheets

(51) Int. Cl.
*H04B 7/06* (2006.01)
*H04W 16/28* (2009.01)
*H04W 76/27* (2018.01)

(56) References Cited

U.S. PATENT DOCUMENTS

| | | | |
|---|---|---|---|
| 2020/0196216 A1* | 6/2020 | Hui | H04L 5/0023 |
| 2021/0266810 A1* | 8/2021 | Koskela | H04B 7/06964 |
| 2021/0337617 A1 | 10/2021 | Bao et al. | |
| 2022/0110181 A1* | 4/2022 | Miao | H04L 5/0023 |
| 2023/0199767 A1* | 6/2023 | Dutta | H04W 72/23 370/315 |
| 2023/0239723 A1* | 7/2023 | Gurelli | H04L 45/24 370/329 |
| 2024/0007881 A1* | 1/2024 | Gutman | H04B 7/15 |
| 2024/0388328 A1* | 11/2024 | Elshafie | H04B 7/0639 |
| 2025/0150118 A1* | 5/2025 | Ali | H04B 7/04013 |
| 2025/0167864 A1* | 5/2025 | Makki | H04B 7/06952 |

FOREIGN PATENT DOCUMENTS

| | | |
|---|---|---|
| WO | 2017/111642 A1 | 6/2017 |
| WO | 2022/133957 A1 | 6/2022 |
| WO | 2022/151128 A1 | 7/2022 |
| WO | 2022/165785 A1 | 8/2022 |

OTHER PUBLICATIONS

Communication dated May 8, 2025, issued by the European Patent Office in European Application No. 23857655.7.

International Search Report and Written Opinion (PCT/ISA/210 and PCT/ISA/237) dated Nov. 13, 2022, issued by International Searching Authority in International Application No. PCT/KR2023/012252.

* cited by examiner

SYSTEM AND METHOD FOR MANAGING BEAM FAILURE RECOVERY IN HIGH-FREQUENCY COMMUNICATION SYSTEMS USING RIS

CROSS-REFERENCE TO RELATED APPLICATIONS

This application is a bypass continuation application of International Application No. PCT/KR2023/012252, filed on Aug. 18, 2023, which is based on and claims priority to Indian Provisional Patent Application No. 202241048856, filed on Aug. 26, 2022 in the Indian Patent Office, and Indian Complete Patent Application No. 202241048856, filed on Jul. 6, 2023 in the Indian Patent Office, the disclosures of each of which are incorporated by reference herein in their entireties.

BACKGROUND

1. Field

The disclosure generally relates to the recovery procedures in case of beam failure in a communication system, and more particularly, to a system and method for managing beam failure recovery in high-frequency communication systems using reconfigurable intelligent surfaces (RIS).

2. Description of Related Art

The demand for wireless data traffic has increased tremendously ever since the deployment of 4G communication systems. Therefore, efforts have been made to develop an improved 5G or fifth-generation communication system. To accomplish higher data rates, a 5G communication system is considered to be implemented in higher frequency (i.e., mmWave) bands. The 5G communication network supports signal transmissions in millimeter wave (mmWave) frequencies and employs directional transmission and reception with beamforming methods. In the beamforming technique, focused signals are sent out to a target receiving device transmitting more power in the target direction to increase the transmission distance.

With an increasing frequency of operation in the mmWave and beyond 5G systems, there is an exponential increase in path loss and penetration losses. Even though the millimeter wave (mmWave) frequencies provide significantly high throughput and low latency, operating the communication system at high frequencies causes frequent beam failures. Beam failure (BF) occurs when a reference signal received power (RSRP) of a serving beam/cell goes below a threshold, rlmInSyncOutOfSyncThreshold, decided by the network. Particularly, when the RSRP of a Radio link monitoring (RLM) reference signal (RS) goes below rlmInSyncOutOfSyncThreshold, the BF is detected. FIG. 1A illustrates an example problem of beam misalignment due to narrow beams. The RSRP drop may be dynamically caused due to the mobility of user equipment (UE) 101 (e.g., a user device) causing misalignment from a serving beam 103 of the base station (BS) 105 to UE 101. The UE 101 may easily become misaligned with a narrow width serving beam 103 due to mobility, in comparison to a wider serving beam 109, and may thereby experience beam failure, as shown in FIG. 1A. Furthermore, FIG. 1B illustrates an example problem associated with narrow beam blockage. As shown in FIG. 1B, narrow width beams such as beam 103 are prone to easier blockages even from relatively small objects 107, as compared to wider beams such as beam 109.

At present, 3GPP standards defines a procedure for beam failure recovery (BFR). BFR is a procedure at a UE to recover from beam failure and continue data transmission without repeating initial access. The UE 101 is provided with a list of alternate beams, candidateBeamRSList, (via RRC) to measure and switch to continue data transmission. BFR may fail if the UE 101 is not able to find an alternate beam within a time threshold, beamFailureRecoveryTime. With increasing frequency, a greater number of narrow beams are required to cover the same area as compared to wider beams, resulting in a larger size of the candidateBeamRSList, as shown in FIG. 2A, according to the related art. Therefore, searching through a large sized candidateBeamRSList would increase the time required for BFR, resulting in high latency. In some cases, the beamFailureRecoveryTime may also expire due to high latency, ultimately causing failure in BFR. Another problem with solutions in the related art for BFR, as illustrated in FIG. 2B, the chances of blockage 107 of more than one beam are greater with narrow width beams, which may result either in high latency due to unnecessary measurement of blocked beams or even failure if no candidate beam is found to be good enough for data transmission. Therefore, BFR procedures in the related art have high latency and high chances of failure with increasing frequency of operation in the mmWave and Beyond 5G systems.

Thus, there is a need to provide a solution for beam failure recovery to overcome the above-mentioned problems. Moreover, there is a need to provide a solution for managing beam failure recovery in which an alternate candidate beam may be found with low latency and high accuracy.

SUMMARY

This summary is provided to introduce a selection of concepts, in a simplified format, that are further described in the detailed description. This summary is neither intended to identify key or essential concepts of the disclosure nor is it intended for determining the scope of the disclosure.

According to an aspect of the disclosure, a method of beam failure recovery managed by a transmitter of a communication system includes: detecting a first occurrence of a beam failure between the transmitter and a receiver; based on the detection of the first occurrence of the beam failure, identifying at least one first reconfigurable intelligent surface (RIS) for transmitting at least one reference signal; transmitting the at least one reference signal to the at least one first RIS; receiving, from the at least one first RIS, a receiver feedback for the at least one reference signal; generating an RIS candidate beam list based on the receiver feedback; and transmitting, to the receiver via the at least one first RIS, a radio resource control (RRC) message including the RIS candidate beam list as a beam failure recovery configuration.

According to an aspect of the disclosure, a method of beam failure recovery managed by a receiver of a communication system includes: receiving, from a transmitter, a radio resource control (RRC) message including a beam failure recovery configuration, the beam failure recovery configuration including a priority threshold value and at least one candidate beam list, the at least one candidate beam list including a reconfigurable intelligent surface (RIS) candidate beam list; comparing a drop in a reference signal received power (RSRP) of a serving beam between the receiver and the transmitter with the priority threshold value;

selecting a candidate beam list of the at least one candidate beam list based on the comparison of the drop in the RSRP with the priority threshold value; determining whether at least one candidate beam is left in the selected candidate beam list; and based on a determination that at least one candidate beam is left in the selected candidate beam list, performing a random access channel (RACH) random access procedure by selecting a next available candidate beam from the selected candidate beam list.

According to an aspect of the disclosure, an apparatus for managing a beam failure recovery in a communication system includes: a transmitter; and at least one processor, wherein the at least one processor is configured to: detect an occurrence of a beam failure between the transmission apparatus and the receiving apparatus; based on the detection of the occurrence of the beam failure, identify at least one RIS for transmitting at least one reference signal; generate an RIS candidate beam list based on a candidate signal received from the at least one first RIS; and control the transmission apparatus to transmit via the at least one identified RIS, a radio resource control (RRC) message to the receiving apparatus, the RRC message including the generated RIS candidate beam list as a beam failure recovery configuration.

According to an aspect of the disclosure, an apparatus for managing a beam failure recovery in a communication system includes: a receiver; and at least one processor, wherein the at least one processor is configured to: receive, from a transmitter, a radio resource control (RRC) message including a beam failure recovery configuration, the beam failure recovery configuration including a priority threshold value and at least one candidate beam list, the at least one candidate beam list including a reconfigurable intelligent surface (RIS) candidate beam list; comparing a drop in a reference signal received power (RSRP) of a serving beam between the receiver and the transmitter with the priority threshold value; select a candidate beam list of the at least one candidate beam list based on the comparison of the drop in the RSRP with the priority threshold value; determine whether at least one candidate beam is left in the selected candidate beam list; and based on a determination that at least one candidate beam is left in the selected candidate beam list, perform a random access channel (RACH) random access procedure based on a selection of a next available candidate beam from the selected candidate beam list.

BRIEF DESCRIPTION OF THE DRAWINGS

The above and other features, aspects, and advantages of certain embodiments the disclosure will be more apparent from the following description taken in conjunction with the accompanying drawings, in which.

DETAILED DESCRIPTION

Figure 1A:
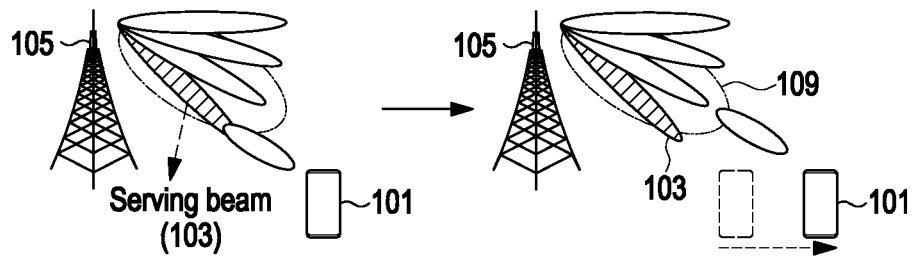
FIG. 1A illustrates an example problem of beam misalignment due to narrow beams.
Figure 1B:
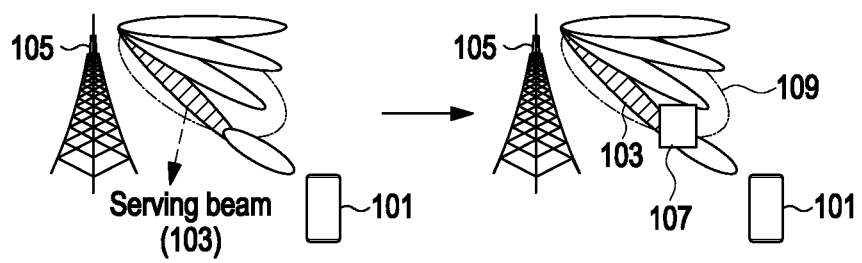
FIG. 1B illustrates an example problem associated with narrow beam blockage.
Figure 2A:
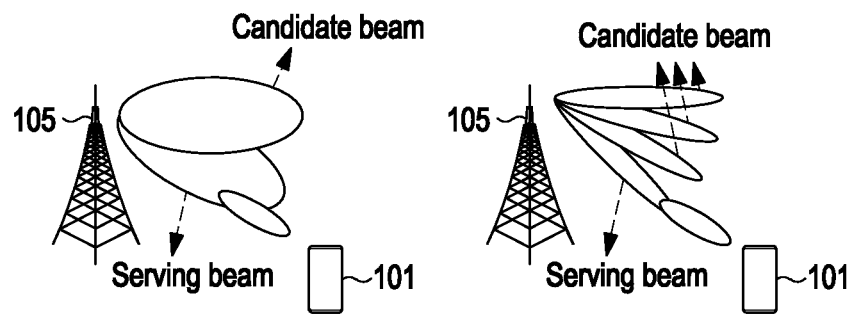
FIG. 2A illustrates an example of high latency during beam failure recovery, according to the related art.
Figure 2B:
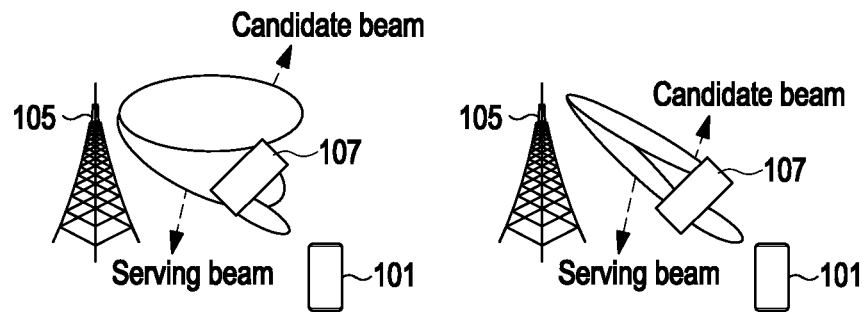
FIG. 2B illustrates an example of candidate beam blockage during beam failure recovery, according to the related art.

To further clarify the advantages and features of the disclosure, a more particular description of specific embodiments will be provided with reference to the appended drawings. It is appreciated that these drawings depict only typical example embodiments and are therefore not to be considered limiting of its scope.

It should be understood at the outset that although illustrative implementations of the embodiments of the disclosure are illustrated below, the disclosure may be implemented using any number of techniques, whether currently known or in existence. The disclosure should in no way be limited to the illustrative implementations, drawings, and techniques illustrated below, including the exemplary design and implementation illustrated and described herein, but may be modified within the scope of the appended claims along with their full scope of equivalents.

Further, skilled artisans will appreciate that elements in the drawings are illustrated for simplicity and may not have been necessarily been drawn to scale or completeness. For example, the flow charts illustrate the respective methods in terms of the most prominent operations involved to help in an improved understanding of aspects of the disclosure. Furthermore, in terms of the construction of respective devices, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having the benefit of the description herein.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or one embodiment or several embodiments or all embodiments. Accordingly, the term "some embodiments" is defined as meaning "no embodiment, or one embodiment, or more than one embodiment, or all embodiments."

The terms "comprise", "comprising", "include", "including", or any other variations thereof, are intended to cover a non-exclusive inclusion, such that a process or method that comprises a list of steps or operations does not include only those steps or operations but may include other steps or operations not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. Also, the various embodiments described herein are not necessarily mutually exclusive, as some embodiments may be combined with one or more other embodiments to form new embodiments. The term "or" as used herein, refers to a non-exclusive or unless otherwise indicated. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

As is traditional in the field, embodiments may be described and illustrated in terms of blocks that carry out a described function or functions. These blocks, which may be referred to herein as units or modules or the like, may be physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

The terminology and structure employed herein are for describing, teaching, and illuminating some embodiments and their specific features and elements and do not limit, restrict, or reduce the spirit and scope of the claims or their equivalents.

It will be understood by those skilled in the art that the foregoing general description and the following detailed description are explanatory of the disclosure and are not intended to be restrictive thereof.

Unless otherwise defined, all terms, and especially any technical and/or scientific terms, used herein may be taken to have the same meaning as commonly understood by one having ordinary skill in the art. Throughout the description, the terms 'signal transmission' and 'data transmission' have been used interchangeably.

Figure 3A:
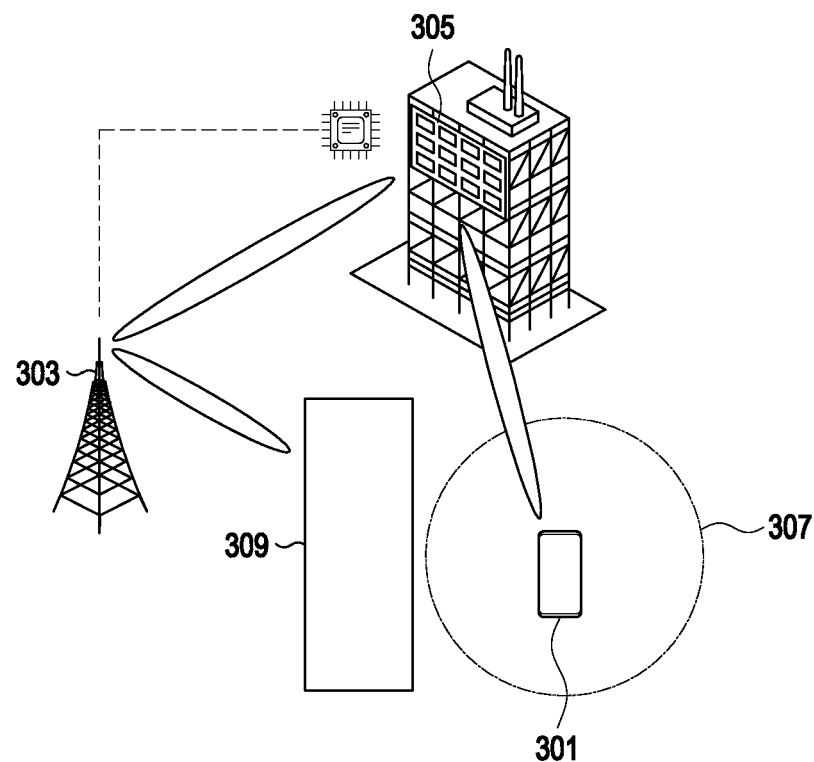
FIG. 3A illustrates an example scenario of an occurrence of beam failure, and of utilizing an RIS for beam failure recovery during beam failure, according to an embodiment of the disclosure.

The disclosure utilizes reconfigurable intelligent surfaces (RIS) for managing a beam failure recovery process in a high-frequency communication system. The RIS corresponds to meta-surfaces that are used to manipulate a path of an incident signal by reflecting the incident signal in a different direction. FIG. 3A illustrates an example scenario of an occurrence of beam failure, and of utilizing an MS for beam failure recovery during beam failure, according to an embodiment of the disclosure. Generally, with high-frequency and narrow-width beams in a communication system, the likelihood of the occurrence of path loss and penetration loss increases. Due to the increment of the path loss and penetration loss, coverage holes 307 associated with a user equipment (UE) 301 may be formed where the signal strength is weak for reliable communication. In such a scenario, a transmitter, for example, a base station (BS) 303 of the high-frequency communication system, may use an RIS 305 to reflect reference signals towards the UE 301, as shown in FIG. 3A. Signal transmission between the BS 303 and the UE 301 may get affected by at least one first blockage 309; i.e., a dynamic blockage. Even in such a scenario, BS 303 may use the RIS 305 to reflect the reference signals towards the UE 301. The BS 303 utilizes the RIS 305 in order to enhance coverage in areas of low or no signal strength such as a coverage hole or a cell edge.

Figure 3B:
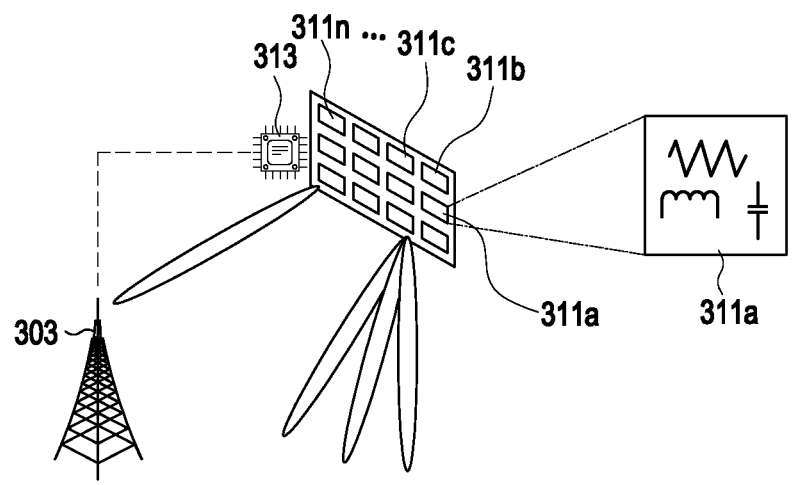
FIG. 3B illustrates an example schematic diagram of an RIS, according to an embodiment of the disclosure.

FIG. 3B illustrates an example schematic diagram of an RIS, according to an embodiment of the disclosure. The presence of one or more passive elements present in the RIS 305 makes the RIS 305 differentiable from an antenna array. Antenna arrays are generally made of active elements like amplifiers, transistors, etc. and passive elements. Also, the antenna arrays may use power sources to produce gains.

However, the RIS may not provide any active antenna gain as the RIS has no active elements. Further, as shown in FIG. 3B, the RIS 305 further comprises an array of identical, substantially identical, or substantially similar unit cells 311a through 311n and an RIS controller 313. Each unit cell in the array of unit cells 311a through 311n acts as a reflective element with some phase, β, and amplitude, α. The RIS controller 313 may control the adjustment of the phase and the amplitude of the unit cells 311a through 311n independently. The RIS controller 313 may further select a corresponding phase and amplitude of a corresponding unit cell of the unit cells 311a through 311n such that the reflected signal from all the unit cells 311a through 311n of the RIS 305 gets constructively interfered within a desired direction, $θ_r$. The direction of reflection of reference signal may be controlled by the BS 303 with the help of the RIS controller 313. A particular configuration mode may also be sent by the BS 303 to the RIS controller 313 for each $θ_r$. The RIS controller 313 may also select an appropriate amplitude and phase (α,β). Thereupon, the reflected signal is computed for each unit cell of unit cells 311a through 311n based on the equation (1):

$$y_i = x_i * α_i e^{jβ_i} \qquad (1),$$

where $y_i$ is the reflected signal for unit cell i, and $x_i$ is the incident signal for unit cell i.

Figure 4A:
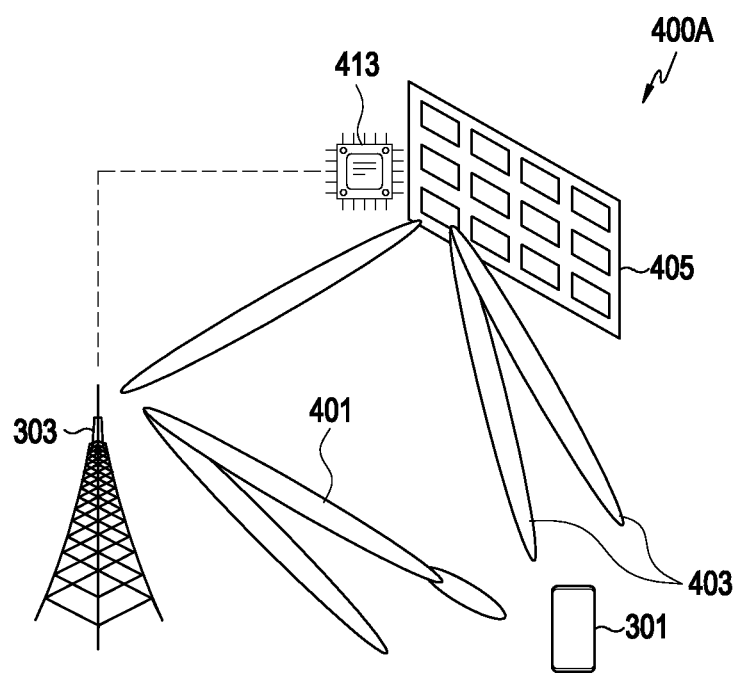
FIG. 4A illustrates an example communication system for managing a beam failure recovery process using a single RIS, according to an embodiment of the disclosure.

Various embodiments of the disclosure will be described herein with the help of an example communication system for managing the beam failure recovery process. FIG. 4A illustrates an example communication system 400A for managing the beam failure recovery process using a single RIS, according to an embodiment of the disclosure. The communication system 400A includes the UE 301, the BS 303, and an RIS 405 including an RIS controller 413. Herein, the UE 301 may also be referred to as a receiver throughout the disclosure without any deviation from the scope of the disclosure. Further, the BS 303 may also be referred to as a transmitter, interchangeably, throughout the disclosure without any deviation from the scope of the disclosure. The BS 303 may also correspond to a remote control device that may perform the operations and functionalities of the BS 303 as described herein. The UE 301 may correspond to an electronic device associated with a user and is configured of one transmitting and/or receiving one or more signals to/from the transmitter. Furthermore, the RIS 405 may also be referred to as a first RIS 405, interchangeably, throughout the disclosure without any deviation from the scope of the disclosure.

The UE 301 may be in communication with the BS 303 directly via a serving beam 401 before experiencing the beam failure. When the beam failure occurs and the data transmission between the BS 303 and UE 301 cannot be completed via the serving beam 401, if no candidate beams are left in candidateBeamRSList (e.g., if all candidate beams in candidateBeamRSList have been determined to be unavailable, due to their own beam failure, unsuitable direction, or other conditions preventing communication with the UE 301 therethrough), then beam failure recovery may be performed by shifting the data transmission to the first RIS 405.

The candidateBeamRSList may correspond to a list of RS candidate beams that may be available for establishing the new connection with the UE 301. The list of RS candidate beams includes the candidate beams that are potential beam-forming options available to the BS 303 for directing signal towards the UE 301. In particular, each specific direction in which the signal could potentially get transmitted is considered a 'beam'. Among these, the beams that offer a desired signal strength and quality for the UE 301 are the candidate beams. The BS 303 selects a set of candidate beams for performing effective communication with the UE 301.

In an embodiment, the BS 303 may identify a suitable RIS, for example, the first RIS 405, using a predefined procedure to shift data transmission to the first RIS 405. The first RIS 405 may have one or more RIS candidate beams 403 for transmitting or redirecting one or more reference signals received from the BS 303 to the UE 301. (It is here noted that the "RIS candidate beams" and the "RS candidate beams" are distinct types of beams; the RS candidate beams are beams directly from the BS 303, while the RIS candidate beams are beams from the RIS 405.) The one or more RIS candidate beams 403 are beams that are potential beam-forming options available to the first RIS 405 for directing signal from the BS 303 towards the UE 301. The first RIS 405 generates one or more RIS candidate beams 403 by reflecting the direct RS candidate beams received from the BS 303, and directs the one or more generated RIS candidate beams towards the UE 301. The UE 301 may be aligned with one of the RIS candidate beams 403. Thereafter, the one or more reference signals received by the RIS 405 from the BS 303 may be further reflected by the first MS 405 towards the UE 301 as one or more MS candidate beams 403.

Figure 4B:
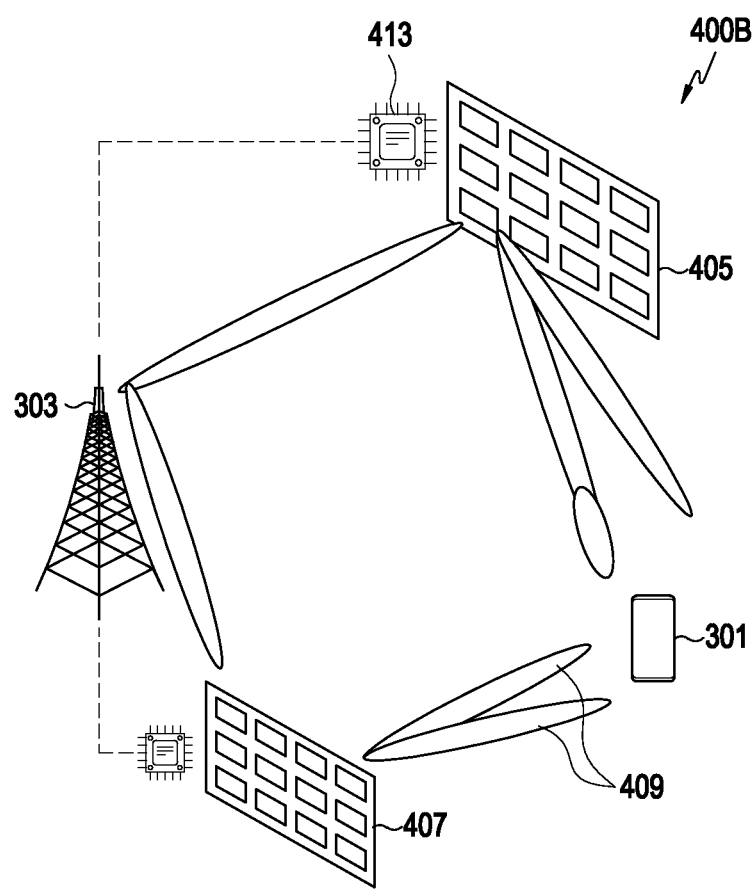
FIG. 4B illustrates an example communication system for managing a beam failure recovery process using a plurality of RIS, according to an embodiment of the disclosure.

FIG. 4B illustrates an example communication system 400B for managing the beam failure recovery process using a plurality of RIS, according to an embodiment of the disclosure. The communication system 400B is different from the communication system 400A in terms of the number of MS present in the communication system 400B. Therefore, a detailed description of the components of the communication system 400A that are same as the components of the communication system 400B is omitted herein for the sake of brevity of the disclosure. Accordingly, as shown in FIG. 4B, the communication system 400B includes at least two RIS, i.e., the first RIS 405 and a second RIS 407 (hereinafter, may also be referred to as MS 407). Initially, the UE 301 may be connected to the BS 303 via the MS 405 before experiencing the beam failure. In an embodiment, if beam failure occurs, and the data transmission between the BS 303 and UE 301 cannot be completed via the first RIS 405, then the BS 303 may perform the beam failure recovery by shifting the data transmission from the first RIS 405 to the second MS 407. The BS 303 may identify at least one more suitable RIS, for example, the second MS 407, using a predefined procedure to shift data transmission from the first MS 405 to the second MS 407. The second MS 407 may have one or more candidate beams 409 for transmitting or redirecting the one or more reference signals received from the BS 303 to the UE 301. The UE 301 may be aligned with one of the candidate beams 409. Thereafter, the one or more reference signals received by the MS 407 from the BS 303 may be further reflected by the second MS 407 towards the UE 301 as the one or more RIS candidate beams 409.

Now, a method for managing the beam failure recovery process will be explained in detail in the forthcoming paragraphs with the help of FIGS. 5 through 13 of the drawings.

Figure 5:
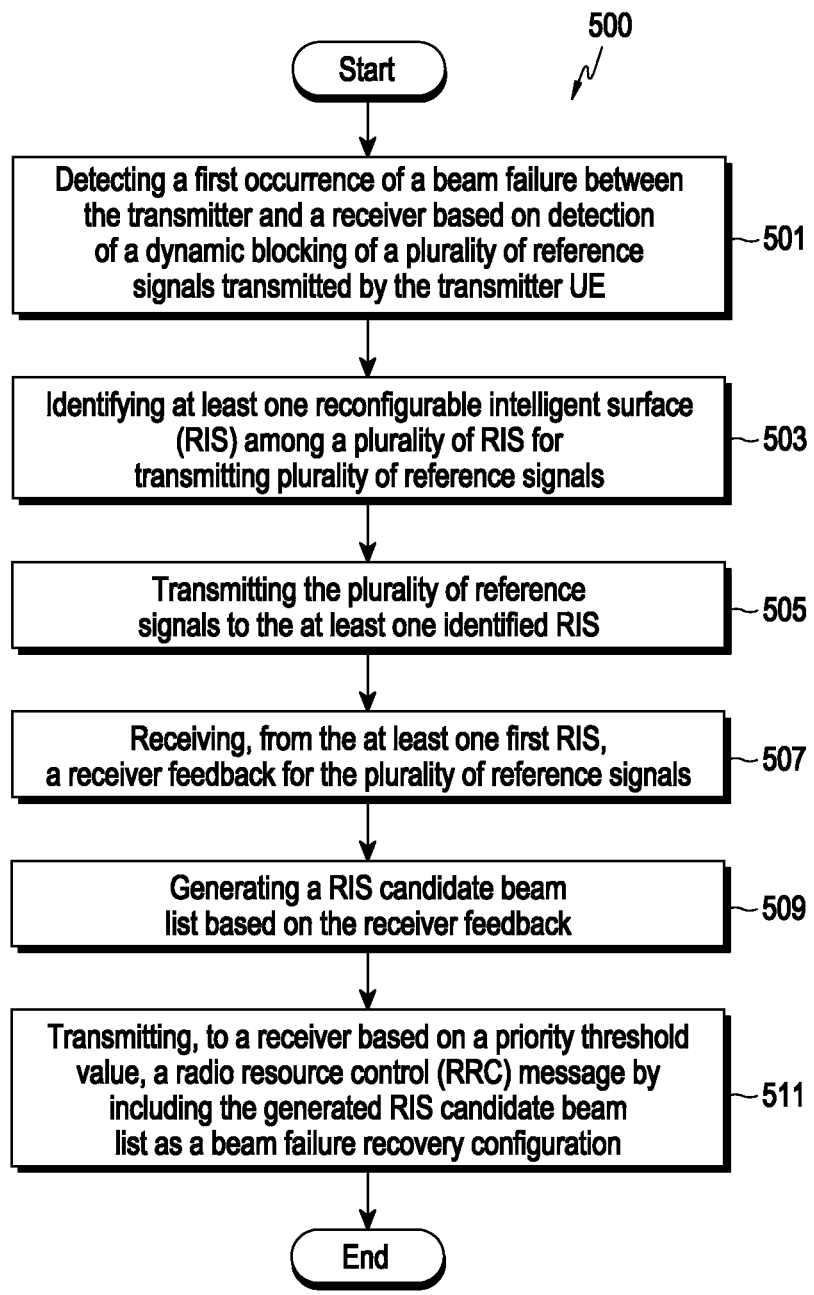
FIG. 5 is a flow chart illustrating a method for beam failure recovery managed by a transmitter of a communication system, according to an embodiment of the disclosure.
Figure 6:
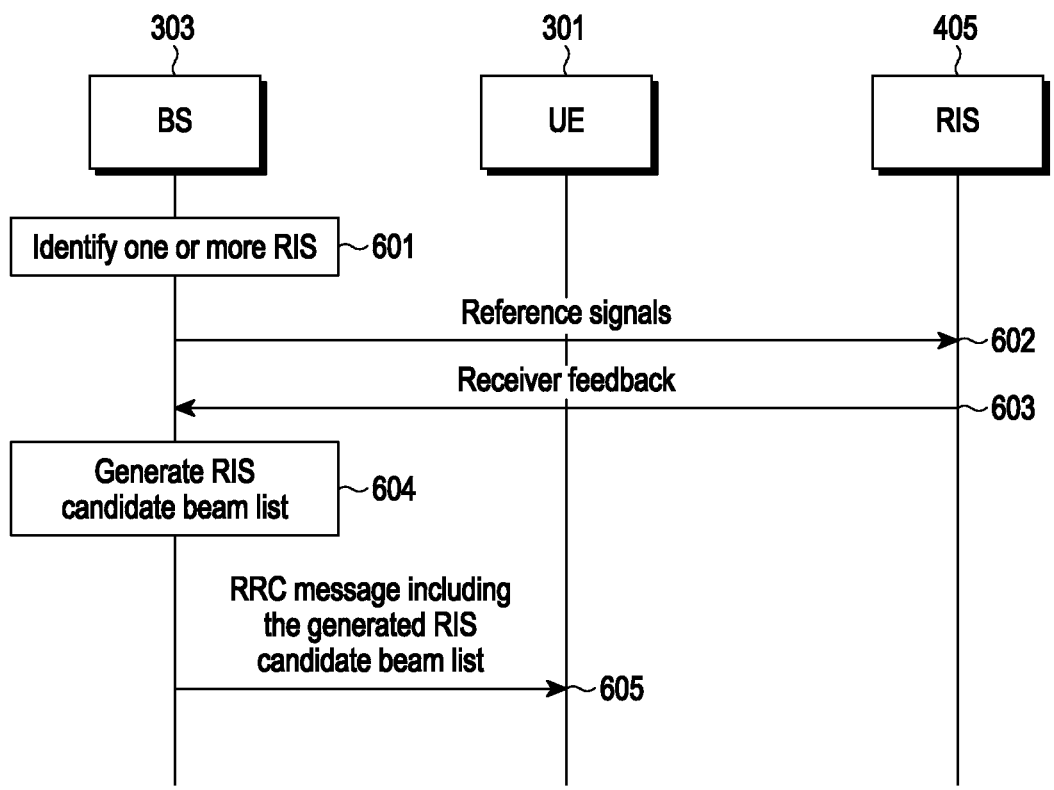
FIG. 6 is a sequence diagram illustrating an implementation of the method of FIG. 5, according to an embodiment of the disclosure.
Figure 7A:
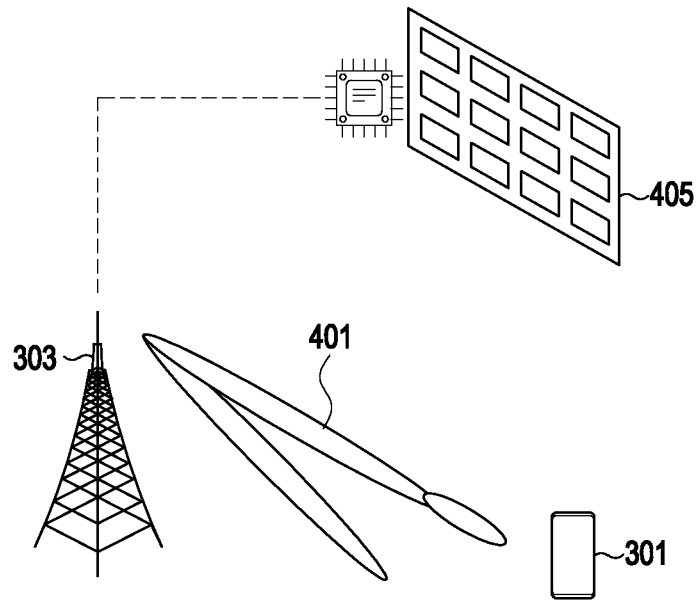
FIG. 7A illustrates an example scenario of data transmission using a direct BS-UE beam.
Figure 7B:
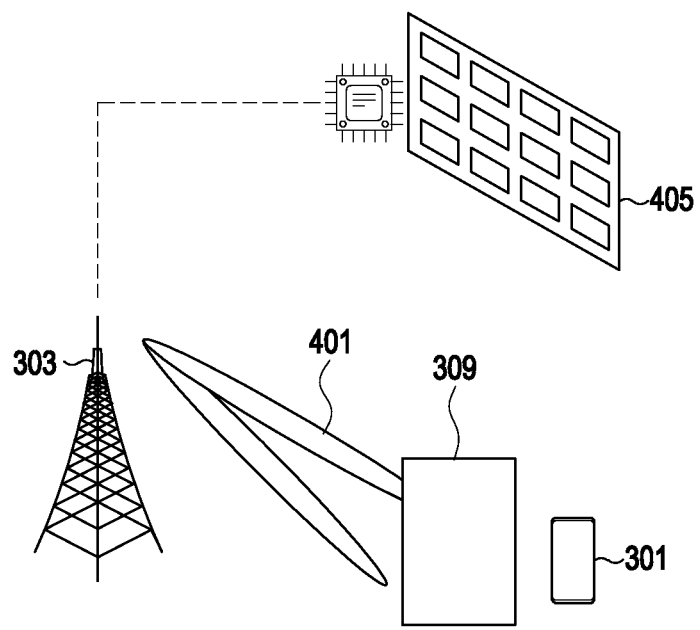
FIG. 7B illustrates an example scenario of a beam failure event due to UE mobility and dynamic blockages.
Figure 7C:
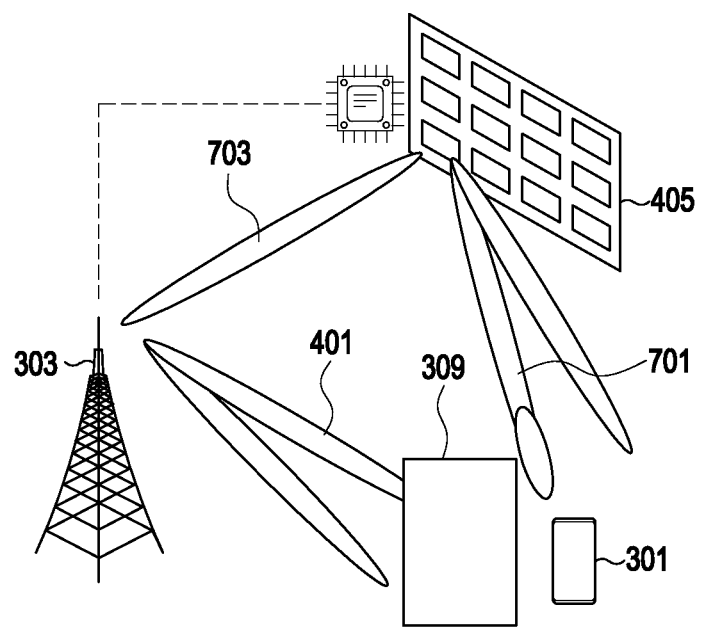
FIG. 7C illustrates an example scenario of data transmission by the BS using a first RIS.

FIG. 5 is a flow chart diagram illustrating a method 500 for beam failure recovery managed by a transmitter (e.g., BS 303) of a communication system (e.g., system 400A or 400B). FIG. 6 is a sequence diagram illustrating an implementation of the method of FIG. 5, according to an embodiment of the disclosure. FIG. 7A illustrates an example scenario of data transmission using a direct BS-UE beam. FIG. 7B illustrates an example scenario of a beam failure event due to UE mobility and dynamic blockages. FIG. 7C illustrates an example scenario of data transmission by the BS 303 using the first RIS 405. A detailed description of the method of FIG. 5 is described below by referring to FIGS. 6, 7A, 7B, and 7C, interchangeably.

The method (at operation 501) includes detecting a first occurrence of a beam failure between the BS 303 and the UE 301 based on detection of a dynamic blocking of at least one reference signal transmitted by the BS 303 to the UE 301. The at least one reference signal may be a signal reference signal or a plurality of reference signals. The beam failure detection may be, for example, according to existing procedures defined in the 3GPP specifications. In an example case, the method as described herein may be performed responsive to any detected beam failure, due to any blockage or beam misalignment. As non-limiting examples, the dynamic blocking may be caused by a dynamic blocker such as moving vehicles, pedestrian traffic, a mass public gathering, construction and infrastructure changes, large moving aerial objects, drones, and the like. As depicted in FIG. 7A, the UE 301 may be connected to the BS 303 via the serving beam 401, which is a direct BS-UE beam. In a non-limiting example, the at least one reference signal transmitted by the BS 303 to the UE 301 became blocked dynamically as shown in FIG. 7B. The dynamic blocking of the at least one reference signal may occur due to the UE mobility or the dynamic blockage caused by the at least one first blockage 309. In such a scenario, as depicted in FIG. 7B, an ongoing data transmission between the BS 303 and the UE 301 may be interrupted.

Upon the detection of the occurrence of the beam failure, the method further (at operation 503) includes identifying at least one first RIS configured for transmitting the at least one reference signal. As an example, the BS 303 may identify the first MS 405 among a plurality of RIS (e.g., 405, 407). Referring to FIG. 6, operation 601 of FIG. 6 corresponds to operation 503 of the method 500.

After identifying the at least one first RIS, the method (at operation 505) may further include transmitting the at least one reference signal to the identified at least one first RIS. In an example, as depicted at operation 602 of FIG. 6, the BS 303 transmits the reference signals to the first RIS 405. Thereafter, at operation 507, the method may then include receiving a receiver feedback for the at least one reference signal from the at least one identified first RIS, so that the BS 303 may determine which RIS reflection directions are closest to the direction of the UE 301. For example, for each configuration mode (e.g., each reflection direction of RIS 405), the UE 301 may receive the reflected RS from the RIS 405 and may provide measurement feedback containing any combination of metrics like RSRP, SINR, SNR, etc. Based on the combination of these metrics, the BS 303 may decide the candidate beam list for the MS 405. This receiver feedback may therefore also be termed a candidate signal. As depicted at operation 603 of FIG. 6, the BS 303 receives the receiver feedback from the first MS 405. The receiver feedback is received by the BS 303 in response to the transmitted at least one reference signal.

Thereafter, the method 500, at operation 509, may further include generating an MS candidate beam list based on the receiver feedback. In one or more embodiments described herein, the MS candidate beam list may include one or more reference signals reflected by at least one MS. The at least one reference signal may be transmitted by the BS 303 periodically to the UE 301 at a predefined time interval known to the UE 301 via radio resource control (RRC) signaling. Knowledge of the predefined interval ensures that the UE 301 knows when to determine the RSRP for the reference signal reflected by MS. In one or more embodiments, the reference signals transmitted to the at least one MS may include existing reference signals such as at least one of, but not limited to, synchronization signal block (SSB) or channel state information (CSI). In some embodiments, the reference signals may include a new reference signal for at least one RIS. As shown at operation 604 of FIG. 6, the BS 303 generates the RIS candidate beam list after receiving receiver feedback from the first RIS 405.

In some embodiments, the BS 303 may also calculate a priority threshold value based on multiple factors including but not limited to receiver position, a receiver's feedback, a position of the at least one RIS, a historical pattern of signal blockage, and priority threshold values that are previously calculated by the transmitter. As an example, the BS 303 may calculate the priority threshold value based on a UE position, UE feedback to the BS 303, a position of the first MS 405, and the historical pattern of signal blockage between the BS 303 and the UE 301, and the priority threshold values that are previously calculated by the BS 303.

At operation 511, the method may further include transmitting, to the receiver via the at least one first RIS, a RRC message including the generated MS candidate beam list as a beam failure recovery configuration. As shown in operation 605 of FIG. 6, the BS 303 transmits the RRC message including the generated MS candidate beam list to the UE 301 as the beam failure recovery configuration. In embodiments where a priority threshold value is calculated, this value may also be included in the RRC message as part of the beam failure recovery configuration. In a non-limiting example, the RRC message may be transmitted periodically by the BS 303 at a predefined time interval, and this time interval is signaled to the UE 301 via the RRC signaling. Further, in another non-limiting example, the RRC message may be transmitted by the BS 303 to the UE 301 whenever there is a change in system configuration. In one or more embodiments, the BS 303 may set, before initiating the data transmission with the UE 301 via the first MS 405, an MS configuration mode for the first RIS 405 for the selection of weight parameters to cover an area of target UEs and transmitting the set RIS configuration mode to the MS controller 413 of the MS 405. The weight parameters may include, but are not limited to, parameters related to a reflection coefficient, a phase of the reflected reference signals, and an amplitude of the reflected reference signals. The RIS configuration mode may include, but not limited to, values associated with each of the reflection coefficient, the phase, and the amplitude for the generation of the reflected reference signal in a desired direction at a desired angle.

In some embodiments, as a result of transmitting the RRC message including the generated RIS candidate beam list as the beam failure recovery configuration, the UE 301 may align with an RIS candidate beam having a highest assigned priority and may continue the data transmission between the BS 303 and the UE 301 via the first RIS 405. In a similar scenario, FIG. 7C depicts data transmission between the BS 303 and the UE 301 via the candidate beam 701 of the first RIS 405, when the serving beam 401 of the BS 303 is dynamically blocked by the at least one first blockage 309. As depicted, the data transmission via the candidate beam 701 is a reflection, at the first RIS 405, of a beam 703 between the BS 303 and the first RIS 405.

In an embodiment of the disclosure, the method for managing the beam failure recovery process by the transmitter may further include detecting a second occurrence of a beam failure between the at least one first RIS and the receiver based on detection of a dynamic blocking of reference signals reflected by the at least one first RIS towards the receiver. Further, the method may include identifying at least one second RIS among a plurality of RIS for transmitting the at least one reference signal, upon the detection of the second occurrence of the beam failure. Thereafter, the method may include changing the assigned priority of the generated MS candidate beam list for the beam failure recovery after the detection of the second occurrence of the beam failure. Finally, the method may include transmitting, based on the change in the assigned priority, the radio resource control message to the receiver via the at least one second MS.

Figure 8A:
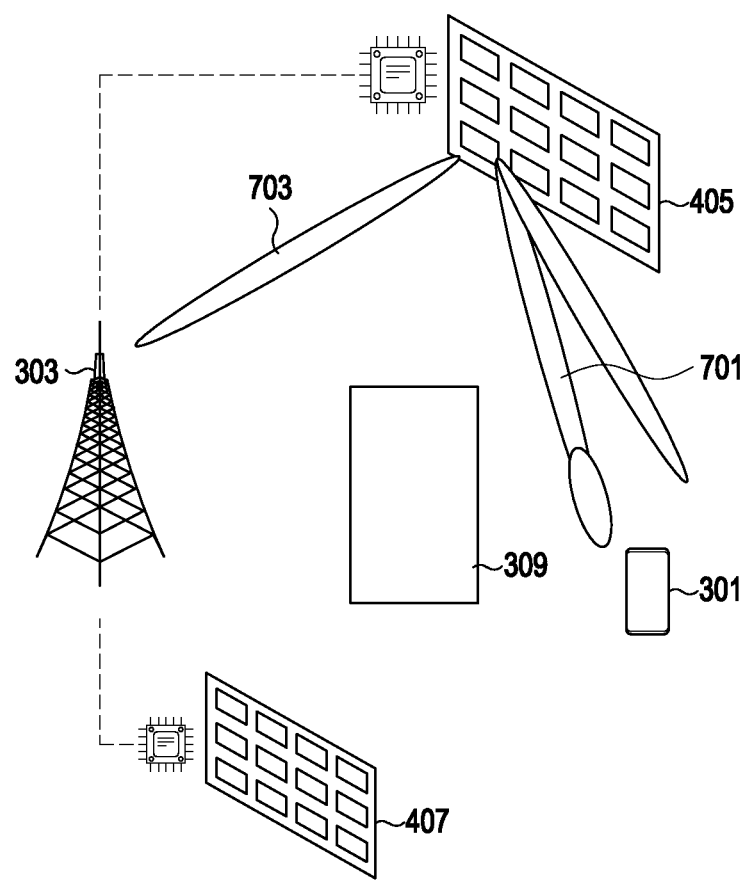
FIG. 8A illustrates an example scenario of data transmission via the first RIS, according to an embodiment of the disclosure.
Figure 8B:
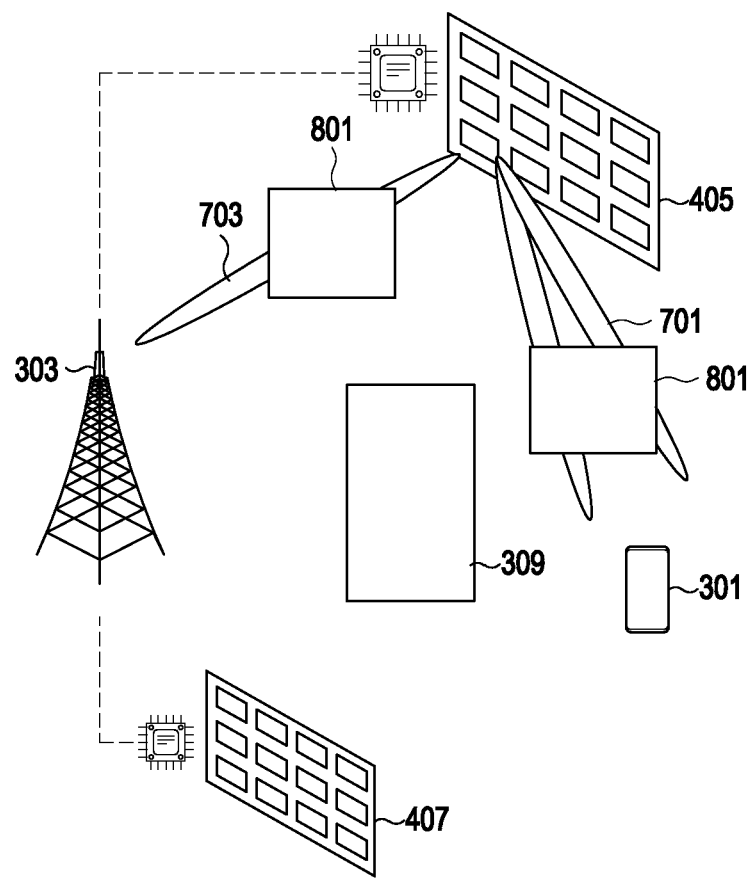
FIG. 8B illustrates an example scenario of a beam failure event when the UE is connected to the BS via the first RIS, according to an embodiment of the disclosure.
Figure 8C:
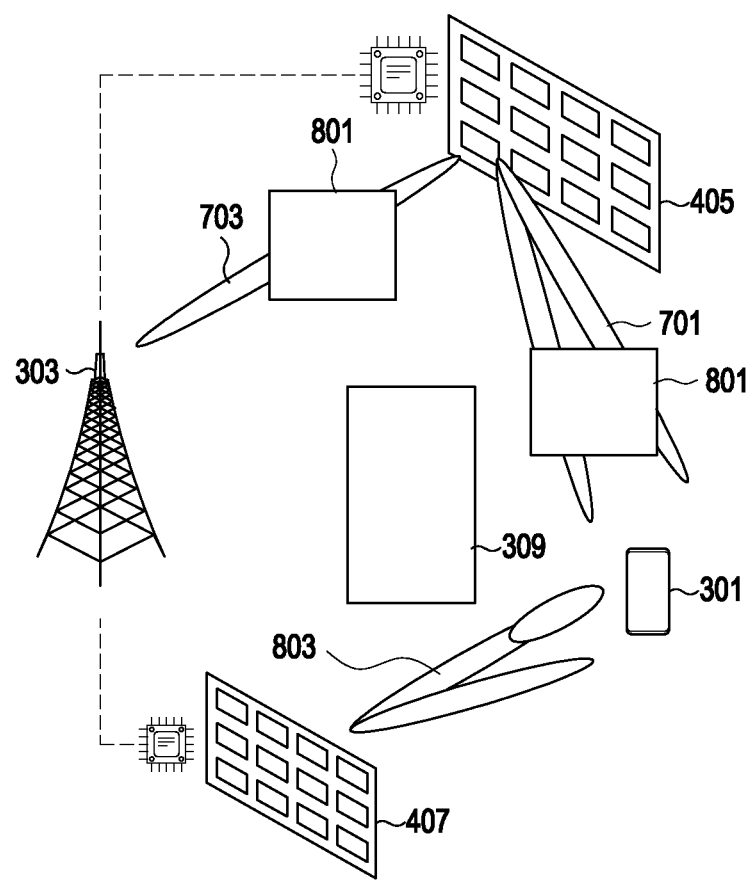
FIG. 8C illustrates an example scenario of beam failure recovery using a second RIS, according to an embodiment of the disclosure.

FIG. 8A illustrates an example scenario of data transmission via the first RIS 405, according to an embodiment of the disclosure. FIG. 8B illustrates an example scenario of a beam failure event when the UE 301 is connected to the BS 303 via the first RIS 405, according to an embodiment of the disclosure. FIG. 8C illustrates an example scenario beam failure recovery using the second MS 407, according to an embodiment of the disclosure. Embodiments of the disclosure will now be described by referring to FIG. 8A, FIG. 8B, and FIG. 8C, interchangeably. As shown in FIG. 8A, the UE 301 may be connected to the BS 303 using the first RIS 405 via the RIS beam 701. The RIS beam 701, in this scenario, may be considered as a first serving MS beam. During the data transmission between the UE 301 and the BS 303 via the first serving MS beam 701, a beam failure may occur due to UE mobility and dynamic blockage by at least one second blockage 801. In an example scenario depicted in FIG. 8B, the dynamic blockage may occur in a path between the BS 303 and the first MS 405, e.g., a blockage of beam 703. In another example scenario also depicted in FIG. 8B, the dynamic blockage may occur in a path between the first RIS 405 and the UE 301, e.g., a blockage of beam 701. As a result of the beam failure with the first MS 405, the data transmission between the UE 301 and the BS 303 may be shifted from the first MS 405 to the second MS 407. The data transmission between the UE 301 and the BS 303 may then continue using the second MS 407 via a second serving RIS beam 803.

Figure 9:
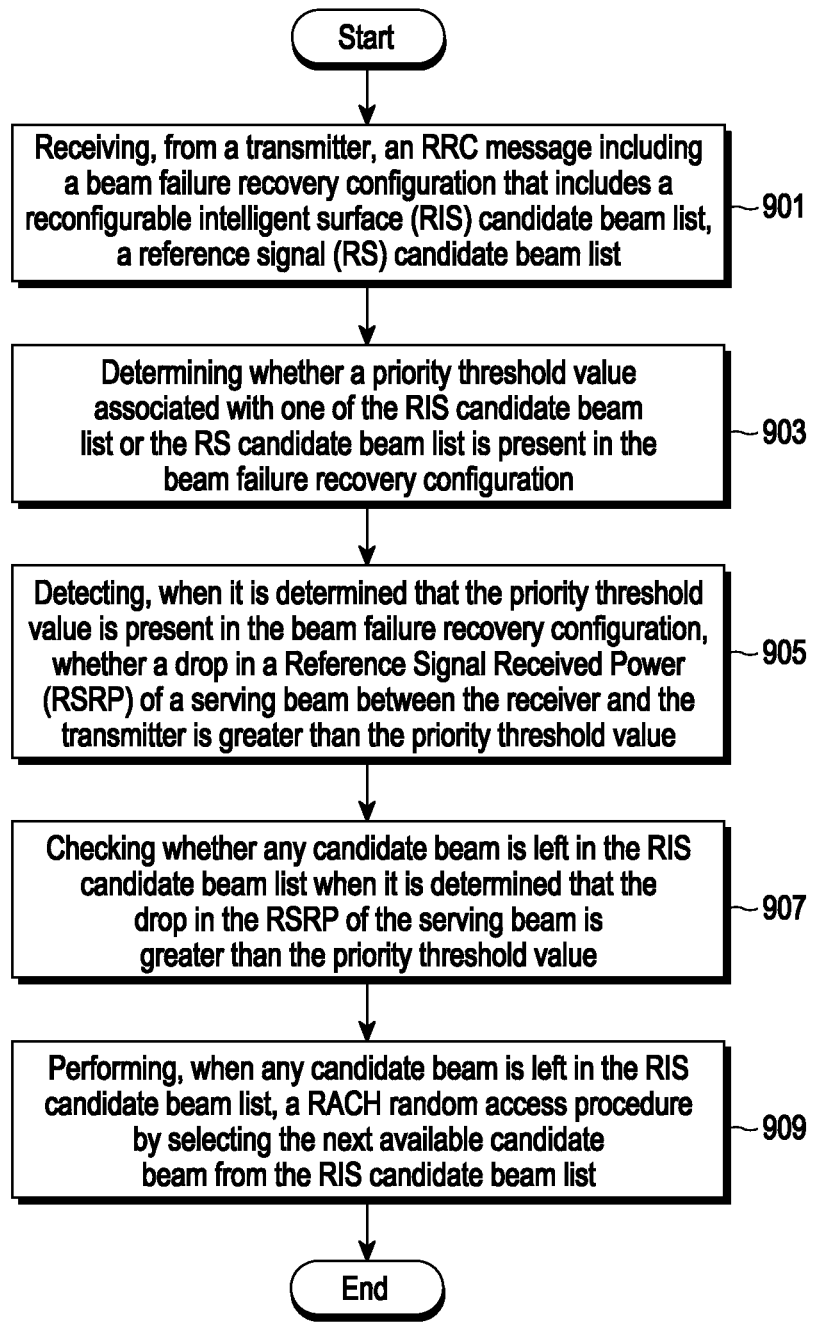
FIG. 9 is a flow diagram illustrating a method of beam failure recovery managed by a receiver of the communication system, according to an embodiment of the disclosure.

FIG. 9 is a flow diagram illustrating a method 900 of beam failure recovery managed by a receiver (e.g., UE 301) of a communication system (e.g. system 400A or 400B), according to an embodiment of the disclosure.

The method (at operation 901), includes receiving, from the BS 303, the RRC message including the beam failure recovery configuration. The failure recovery configuration may include the MS candidate beam list and a reference signal (RS) candidate beam list. In one or more embodiments, the UE 301 may detect the occurrence of the beam failure based on the UE mobility and detection of the dynamic blockage in the reception of the reference signals due to an object between the UE 301 and the BS 303. The object between the UE 301 and the BS 303 may be considered as a blockage as described above herein. Thereafter, the UE 301 may activate a beam failure recovery timer in response to the detection of the occurrence of beam failure. In an embodiment of the disclosure, the beam failure recovery configuration may further includes the list of RIS identification IDs and the priority threshold associated with the RIS candidate beam list or the RS candidate beam list. The RS candidate beam list may correspond to a list of direct beams between the UE 301 and the BS 303. In an embodiment of the disclosure, the UE 301 may also identify, for the beam failure recovery, one of serving RIS candidates or non-serving RIS candidates corresponding to the RIS candidate beam list based on corresponding RIS identification IDs that are included in the list of RIS identification IDs.

After receiving the RRC message from the BS 303, the method 900, at operation 903, may further include determining whether the priority threshold value associated with one of the RIS candidate beam list or the RS candidate beam list is present in the beam failure recovery configuration. When it is determined that the priority threshold value is present in the beam failure recovery configuration, then the method (at operation 905) may further include determining whether a drop in the RSRP of the serving beam between the UE 301 and the BS 303 is greater than the priority threshold value. In an embodiment of the disclosure, when the drop in the RSRP of the serving beam is greater than the priority threshold value, a selection priority for selecting a candidate beam from the RIS candidate beam list corresponding to the non-serving RIS candidates has a higher weightage over a selection priority for selecting a candidate beam from the MS candidate beam list corresponding to the serving MS candidates. In an embodiment of the disclosure, when the drop in the RSRP of the serving beam is less than the priority threshold value, a selection priority for selecting a candidate beam from the RIS candidate beam list corresponding to the serving RIS candidates has a higher weightage over a selection priority for selecting a candidate beam from the RIS candidate beam list corresponding to the non-serving RIS candidates.

After determining that the drop in the RSRP of the serving beam is greater than the priority threshold value, the method 900, at operation 907, may further include determining or checking whether at least one candidate beam is left in the RIS candidate beam list. For the purposes of this disclosure, a candidate beam is "left in a candidate beam list" if it has not yet been determined that the candidate beam is unsuitable for connection with the UE 301. If such determination occurs, the candidate beam may be considered no longer a candidate beam, and removed from the list or indicated as unavailable. Unless and until such determination occurs, the candidate beam is considered "available." When it is determined that at least one candidate beam is left in the RIS candidate beam list, the method 900, at operation 909, may further include performing a random access channel (RACH) random procedure by selecting the next available candidate beam from the MS candidate beam list.

In an embodiment of the disclosure, when it is determined that no candidate beam is left in the RIS candidate beam list, then the method may also include determining whether any candidate beam is left in the RS candidate beam list. In an embodiment of the disclosure, the UE 301 may determine or check whether any candidate beam is left in the RS candidate beam list when it is determined that the drop in the RSRP of the serving beam is less than the priority threshold value. In an embodiment of the disclosure, the UE 301 may determine or check whether any candidate beam is left in the RS candidate beam list when it is determined that the priority threshold value is absent in the beam failure recovery configuration.

Accordingly, when any candidate beam is left in the RS candidate beam list, the UE 301 may perform the RACH random access procedure by selecting the next available candidate beam from the RS candidate beam list. In an embodiment of the disclosure, the UE 301 may also determine or check whether any candidate beam is left in the RIS candidate beam list when it is determined that no candidate beam is left in the RS candidate beam list. Accordingly, the UE 301 may perform, when any candidate beam is left in the RIS candidate beam list, the RACH random access procedure by selecting a candidate beam from the RIS candidate beam list.

In particular, the BS 303 may identify a suitable RIS and includes the reference signals reflected by the RIS 405 or the 407 in a new RRC element, RIScandidateBeamList, and thereafter transmits the new RRC element to the UE 301. The BS 303 may periodically transmits the reference signals in RIScandidateBeamList at the predefined time interval that is known to the UE 301 via the RRC signaling. This enables the UE 301 in determining the RSRP drop in the reference signal at the known predefined time interval. The BS 303 may also send the appropriate configuration mode to the RIS controller 413 of the RIS 405 or 407 for calculation of proper weights ($\alpha$, $\beta$), such that the area of the target UEs may be appropriately covered. Due to the appropriate configuration mode, the RIS 405 or 407 may reflect an appropriate reflected reference signal toward a desired UE.

In one or more embodiments, when beam failure recovery process is to be performed using single RIS, for example, the first RIS 405, the reference signals reflected by the MS 405 may be represented by the equation (2):

$$y_k = \Sigma_i x_i^* \alpha_{ik} e^{j\beta ik}, \qquad (2),$$

where $i \in \{1, N\}$, $k=(1, 2, \ldots, M)$, wherein N is the number of RIS unit cells, M is the number of RIS candidate beams, $y_k$ is the reflected signal for $k^{th}$ RIS beam, and $x_i$ is the incident signal for unit cell i.

In an embodiment of the disclosure, the method may further include assigning a priority to the generated RIS candidate beam list for the beam failure recovery process after the detection of the first occurrence of the beam failure. For assigning the priority to the generated RIS candidate beam list, at first the UE 301 may detect the drop in the RSRP of the serving beam between the BS 303 and the UE 301. Secondly, the UE 301 may also determine whether a value of the detected drop in the RSRP of the serving beam is greater than the priority threshold value. Thereafter, the UE 301 may assign a highest priority to the generated RIS candidate beam list over the serving beam when the value of the detected drop in the RSRP of the serving beam is greater than the priority threshold value.

In particular, RACH resources must be for each of the RIS candidate beams to trigger RACH in the case of beam failure recovery is required at the UE's 301 end. The prioritized RIS candidate beams may help in faster beam failure recovery in case of complete blockage in a communication path between the BS 303 and the UE 301. The priority threshold may be controlled by a new RRC element RISPriornyTh. In an embodiment, when the drop in the RSRP is detected to be greater than the RISPriorityTh, the UE 301 may prioritize the RIScandidateBeamList. In an alternate embodiment, when the drop in the RSRP is detected to be less than the RISPriornyTh, the UE 301 may prioritize the candidateBeamRSList over the RIScandidateBeamList. When the beam failure is detected, then at that point in time, the UE 301 may set a timer for the beam failure recovery. The timer may be defined as beamFailureRecoveryTimer. The assignment of the priority to the MS candidate beams may help in avoiding the expiry of the beamFailureRecoveryTimer by not measuring potentially blocked direct beams, resulting in fast beam failure recovery with an improved latency.

Figure 10:
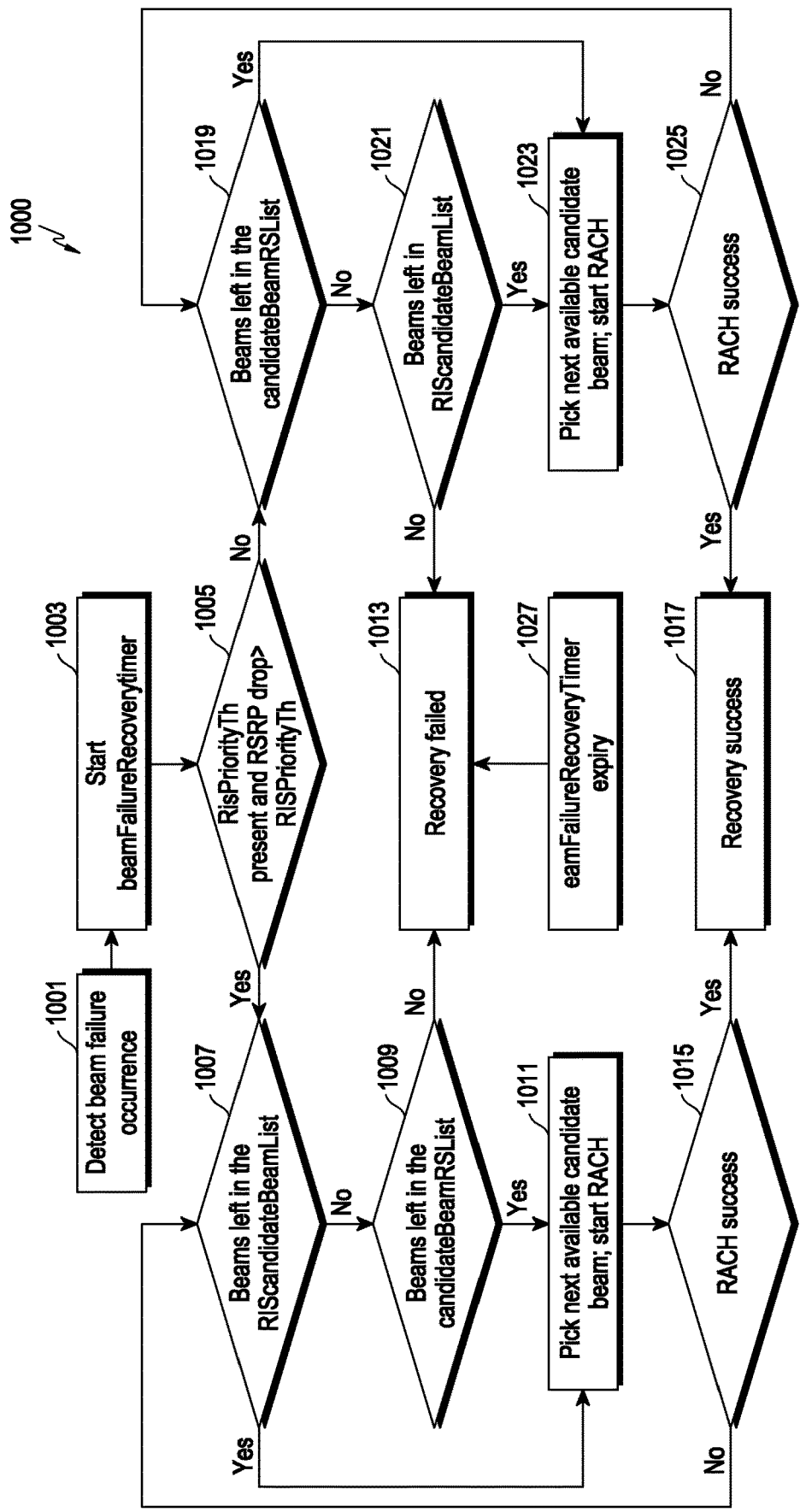
FIG. 10 is a flow diagram illustrating a method of beam failure recovery managed by a receiver using a single RIS, according to an embodiment of the disclosure.

FIG. 10 is a detailed flow diagram illustrating a method 1000 of beam failure recovery managed by a receiver (e.g., the UE 301) using a single RIS (e.g., the RIS 405), according to an embodiment of the disclosure. In accordance with an embodiment of the disclosure, at operation 1001, the UE 301 may detect the occurrence of the beam failure upon detection of the dynamic blocking of the at least one reference signal.

Upon detecting that the beam failure has occurred, the UE 301, at operation 1003, may initiate the beam failure recovery by starting the beam failure recovery timer, e.g., beamFailureRecoveryTimer, in response to the determination of the occurrence of the beam failure. Thereafter, at operation 1005, the UE 301 may determine or check whether the priority threshold value is present in the received beam failure recovery configuration and thereafter whether the drop in the RSRP is greater than the priority threshold value. If at operation 1005, it is determined that the priority threshold value is present and the drop in the RSRP is greater than the priority threshold value, then the UE 301, at operation 1007, determines or checks whether at least one RIS candidate beam is left available in the RIScandidateBeamList. This may be termed a selection of the RIScandidateBeamList over, for example, the candidateBeamRSList. If at operation 1007, the UE 301 determines that at least one MS candidate beam is left in the RIScandidateBeamList, then the UE 301 may select the next available RIS candidate beam and initiate the RACH process at operation 1011.

Further, if at operation 1007, it is determined that no MS candidate beam is left in the RIScandidateBeamList, then the UE 301 may determine or check (at operation 1009) whether at least one RS candidate beam is left in the candidateBeamRSList. This may be termed a selection of the candidateBeamRSList as a secondary candidate beam list. If at operation 1009, the UE 301 determines that at least one RS candidate beam is left in the candidateBeamRSList, then the UE 301 may select the next available RS candidate beam and initiate the RACH process at operation 1011.

If the RACH process is determined to be successful at operation 1015, the UE 301 may continue to perform the data transmission with the BS 303 via the selected candidate beam, and the beam failure recovery may be considered as completed successfully at operation 1017. If the RACH process is determined to be unsuccessful at operation 1015, the UE 301 determines whether another candidate beam is left in RIScandidateBeamList or candidateBeamRSList, at operations 1007 and 1009 respectively.

However, if at operation 1009, the UE 301 determines that no RS candidate beam is left in the candidateBeamRSList, then the UE 301 may determine that the beam failure recovery has failed at operation 1013. In an embodiment of the disclosure, the UE 301 may also consider that the beam failure recovery has failed when the beamFailureRecoveryTimer expires, as depicted at operation 1027.

In an embodiment of the disclosure, if at operation 1005, it is determined that the priority threshold value is present and the drop in RSRP is less than the RISPriorhyTh, then the UE 301 may determine or check (at operation 1019) whether at least one RS candidate beam is left in the candidateBeamRSList. This may be termed a selection of the candidateBeamRSList over, for example, the RIScandidateBeamList. If at operation 1019, the UE 301 determines that at least one RS candidate beam is left in the candidateBeamRSList, then the UE 301 may select the next available RS candidate beam and start the RACH process at operation 1023. If the RACH process is successful at operation 1025, then the UE 301 may continue to perform data transmission with the BS 303 via the selected RS candidate beam and may consider the beam failure recovery as completed at operation 1017. Further, if at operation 1019, the UE 301 determines that no RS candidate beam is left in the candidateBeamRSList, then the UE 301 may determine or check (at operation 1021) whether at least one RIS candidate beam is left in the RIScandidateBeamList. This may be termed a selection of the RIScandidateBeamList as a secondary candidate beam list. If at operation 1021, the UE 301 determines that at least one RIS candidate beam is left in the RIScandidateBeamList, then the UE 301 may select the next available RIS candidate beam and start the RACH process at operation 1023. If the RACH process is determined to be unsuccessful at operation 1025, the UE 301 determines whether another candidate beam is left in RIScandidateBeamList or candidateBeamRSList, at operations 1019 and 1021 respectively.

However, if at operation 1021, it is determined that no RIS candidate beam is left in the RIScandidateBeamList, then the UE 301 may consider that the beam failure recovery is failed.

Figure 11:
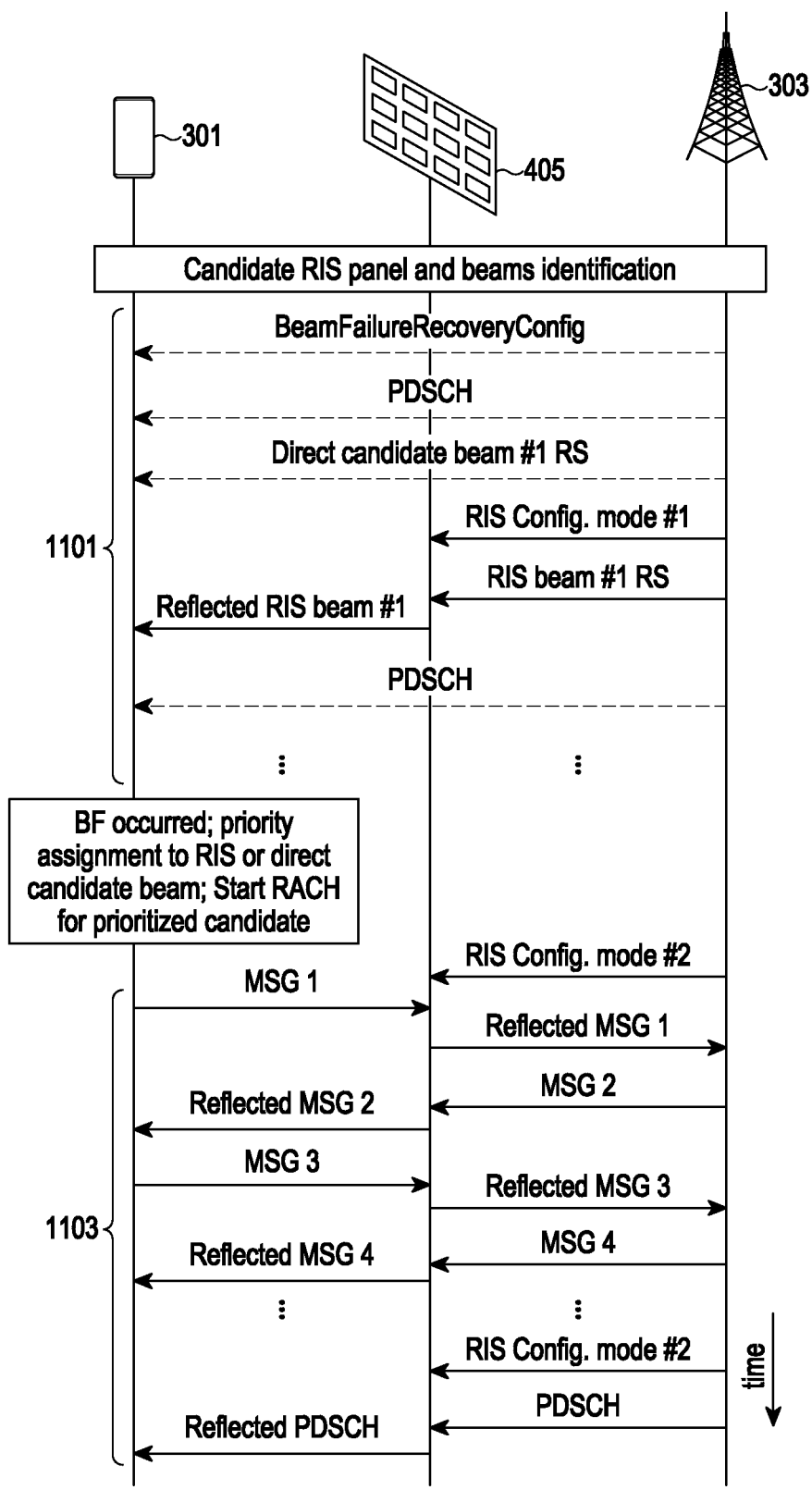
FIG. 11 is a message sequence diagram illustrating an implementation of a method of beam failure recovery using the single RIS, according to an embodiment of the disclosure.

FIG. 11 is a message sequence diagram illustrating an implementation of a method of beam failure recovery using a single RIS (e.g., RIS 405), according to an embodiment of the disclosure. FIG. 11 illustrates, in block 1101, sending of data indicating the physical data shared channel (PDSCH), the beam failure recovery configuration (e.g., BeamFailureRecoveryConfig), and a reference signal of the RS candidate beam (direct candidate beam #1 RS), to the UE 301. An MS beam reflected by the RIS 405 (reflected RIS beam #1) may also be sent to the UE 301, in response to the reference signal (MS beam #1 RS) to the RIS 405. The BS 303 may send configuration mode data (MS Config. mode #1) to enable the MS 405 to reflect the incident signals from the BS 303 in a desired direction towards the UE 301. The operations performed in the block 1101 may be repeated unless occurrence of beam failure (BF) is determined by the UE 301. When beam failure occurs and the priority is assigned to the RIS 405 or direct candidate beams, e.g., the RS candidate beams, the UE 301 may start the RACH process for the prioritized candidate and accordingly enable the RIS 405 to cover the area of the target UE 301 based on the appropriate configuration mode (MS Config. Mode #2) received from the BS 303. Thus, the beam failure recovery is completed and the UE 301 continues data transmission with the BS 303 via the MS 405, as depicted using the message flow in block 1103 of FIG. 11.

In another embodiment of the disclosure, to shift data transmission to another RIS, the BS 303 may identify at least one second MS 407 suitable for the UE 301 in advance. Similar operations may be performed for the identification of the second MS 407 as described above with reference to the identification of the first MS 405. The reference signal reflected by the MS 407 may be included by the BS 303 in the RIScandidateBeamList and may be periodically transmitted to the UE 301. The BS 303 may also send the appropriate configuration mode to the corresponding MS controller of the MS 407 for proper weights ($\alpha$, $\beta$) to appropriately cover the area of target UE 301. For each MS among two or more RIS, the reflected signal may be represented by the equation (3):

$$y_{kl} = \Sigma_i x_{il} * \alpha_{ikl} e^{j\beta_{ikl}} \quad (3),$$

where $i \in \{1, N\}$, $k=(1, 2, \ldots, M)$, $l=(1, 2, \ldots, L)$, N is the number of RIS unit cells, M is the number of RIS candidate beams, L is the number of MS panels, $y_{kl}$ is the reflected signal for $k^{th}$ MS beam of the $l^{th}$ RIS panel, and $x_{il}$ is the incident signal for unit cell i of the $l^{th}$ RIS panel. The BS 303 may pass the appropriate RIS beams as MS candidate beams and accordingly set the MS configuration mode. It is to be noted that the RACH resources must be present for each of the MS candidate beams for the UE 301 to trigger RACH in the case of beam failure recovery.

In an embodiment of the disclosure, when two or more RIS are used, the UE 301 may assign priority to non-serving RIS candidate beams, to help in faster beam failure recovery in case of complete blockage, such that if the drop in serving RSRP exceeds the RISPriorityTh, then the UE 301 may use candidate beams from a non-serving RIS with priority. To differentiate between a serving and the non-serving MS candidates, MS identification RISid may be used to indicate the RIS identifier corresponding to RIScandidateBeamList.

Figure 12:
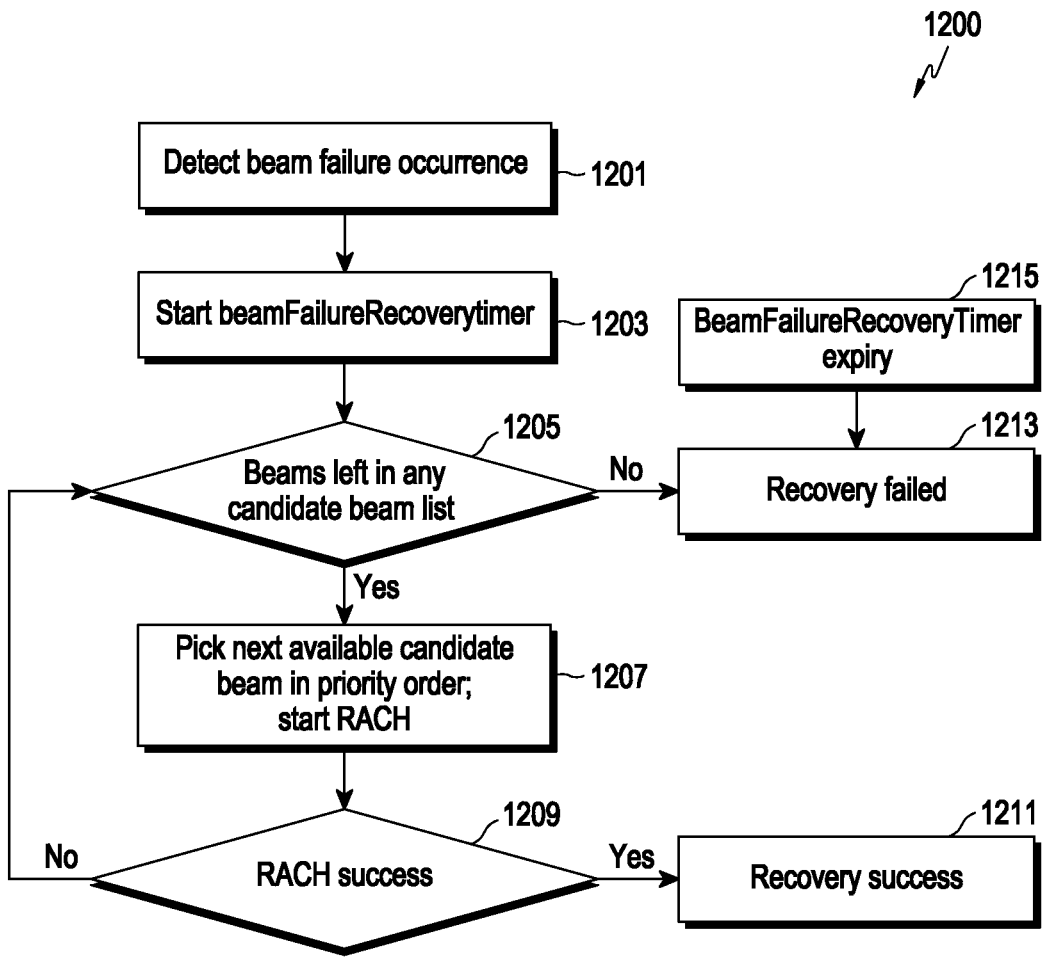
FIG. 12 is a flow diagram illustrating a method of beam failure recovery using a plurality of RIS, according to an embodiment of the disclosure.
Figure 13:
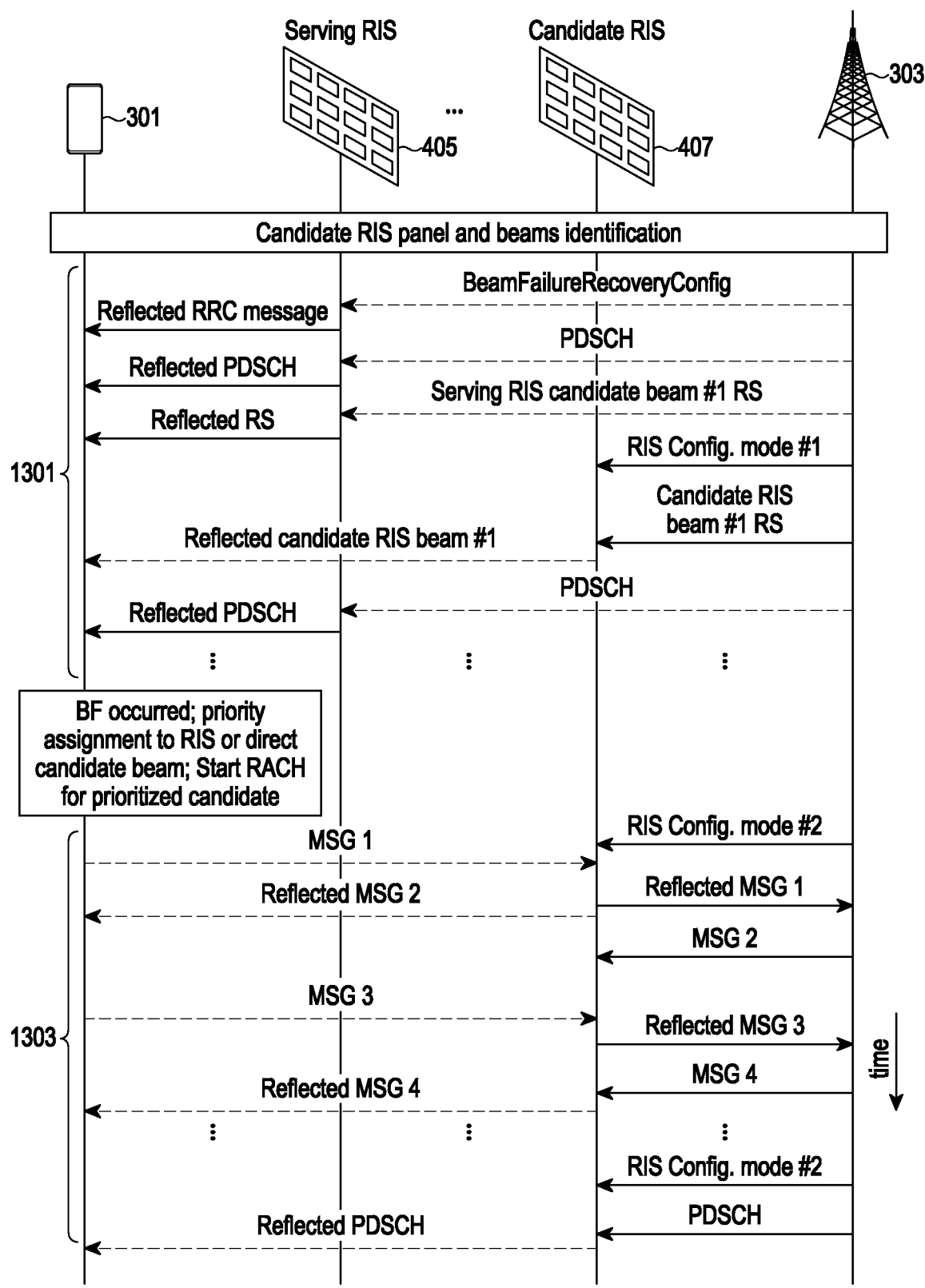
FIG. 13 is a message sequence diagram illustrating an implementation of a method of beam failure recovery using the plurality of RIS, according to an embodiment of the disclosure.

FIG. 12 is a flow diagram illustrating a method 1200 of beam failure recovery using a plurality of RIS, according to an embodiment of the disclosure. FIG. 13 is a message sequence diagram illustrating an implementation of a method of beam failure recovery using the plurality of RIS, according to an embodiment of the disclosure. FIG. 12 and FIG. 13 will now be described together. The process flow for managing the beam failure recovery using the plurality of MS is similar to that of the process flow for managing the beam failure recovery using the single MS, except the method operations associated with the RS candidate beam list candidateBeamRSList, and the priority threshold value RISPriorityTh.

At operation 1201, the UE 301 may detect occurrence of the beam failure. Then the UE may initiate the beam failure recovery process by starting the beam failure recovery timer beamFailureRecoverytimer at operation 1203. Similar to the process described in the context of managing the beam failure recovery using single MS in FIG. 10, at operation 1205, the UE 301 may determine or check whether any candidate beams are left in any of the candidateBeamRSList and the RIScandidateBeamList based on the presence of the RISPriorityTh and the determination that the drop in the RSRP is one of greater or less than the RISPriorityTh. If at least one candidate beam is left in any of the candidateBeamRSList and the RIScandidateBeamList, then the UE 301 may select the next available candidate beam in accordance with in a priority order and start the RACH process at operation 1207. The priority order may be determined based on the RISPriorityTh such that if the drop in the RSRP is greater than the RISPriorityTh, a first priority may be assigned to the RIS candidate beams corresponding to non-serving RIS 407 based on an RISid of RIS 407 and the corresponding RIScandidateBeamList. A second priority lower than the first priority may be assigned to the RIS candidate beams corresponding to serving RIS 405. Finally, a least priority may be assigned to the candidate beams of the direct candidate beam list, i.e., candidateBeamRSList.

Further, if the drop in the RSRP is less than RISPriorityTh, the first priority may be assigned to the RIS candidate beams of serving RIS 405 based on the RISid of RIS 405 and the corresponding RIScandidateBeamList, and the second priority may be assigned to candidate beams corresponding to non-serving RIS 407. Finally, the least priority may be assigned to the candidate beams of the direct candidate beam list candidateBeamRSList. In either case, the direct beams are assumed to be blocked as the data transmission between the UE 301 and the BS 303 was being carried out using the RIS 405 at the time of the occurrence of beam failure. The flow of signals depicted in block 1301 of FIG. 13 is similar to that of the block 1101 of FIG. 11, and therefore a detailed description of the same is omitted herein for the sake of brevity of the disclosure.

Further, at operation 1209, in response to RACH success, the UE 301 may consider the beam failure recovery as completed successfully at operation 1211, and thus the data transmission between the UE 301 and the BS 303 is shifted to the RIS 407 from the RIS 405, as depicted in block 1303 of FIG. 13.

In case of RACH failure, the availability of the next candidate beam in the priority may be determined by the UE 301. At operation 1205, if it is determined that no candidate beam is left in any of the candidate beam lists scanned in the priority order, then the UE 301 may consider the beam failure recovery as failed at operation 1213. In an embodiment, the UE 301 may also consider the beam failure recovery as failed in response to the expiry of the beamFailureRecoverytimer at operation 1215.

Figure 14:
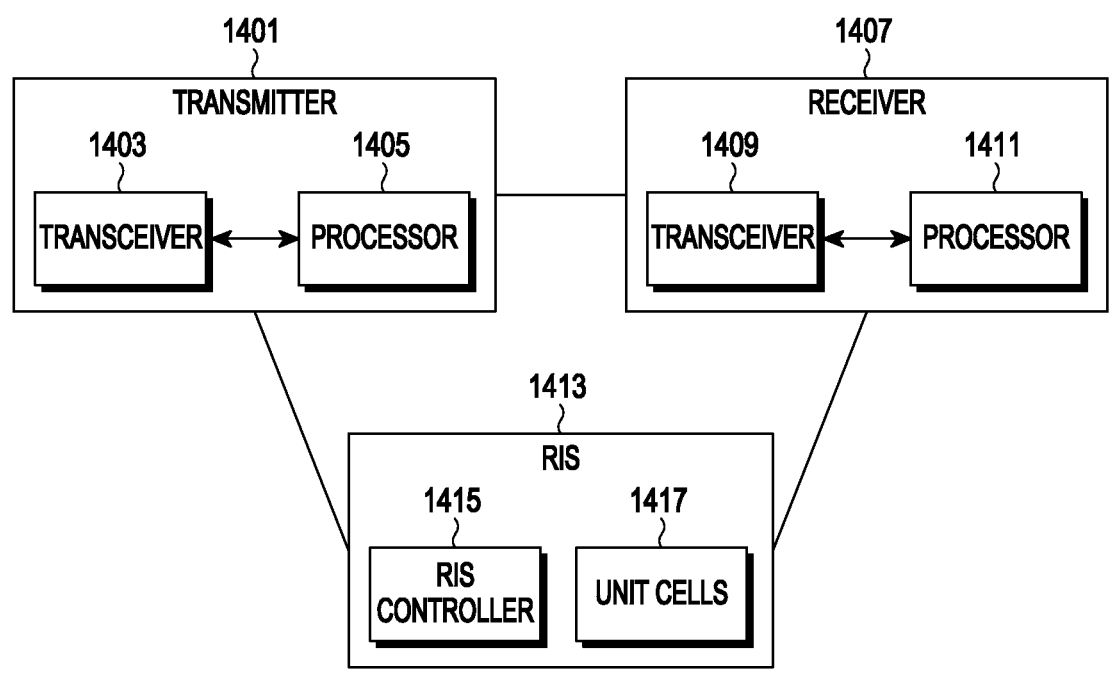
FIG. 14 is a block diagram depicting a high-frequency communication system for managing beam failure recovery, according to an embodiment of the disclosure.

FIG. 14 is a block diagram depicting a high-frequency communication system 1400 for managing beam failure recovery, according to an embodiment of the disclosure. In an embodiment, the high-frequency communication system 1400 may comprise a transmission apparatus 1401, a receiving apparatus 1407, and one or more RIS 1413. The transmission apparatus 1401 may include a transceiver 1403 and a processor 1405. The transceiver 1403 may transmit or receive one or more signals to or from the receiving apparatus 1407 and the one or more RIS 1413. The transceiver 1403 may receive the one or more signals on a wired channel or wireless channel. The transceiver 1403 may be configured to provide the one or more received signals to the processor 1405. The transceiver 1403 may be further configured to output the signal from the processor 1405 on a wired channel or wireless channel. The transmission apparatus 1401 may also comprise a memory that may store a program and data required for the operation of the transmission apparatus 1401. Furthermore, the memory may store control information or data included in a signal obtained by the transmission apparatus 1401. The memory may include a storage medium such as, without limitation, a read-only memory (ROM), a random-access memory (RAM), a hard disk, a compact disc ROM (CD-ROM), and a digital versatile disc (DVD), or a combination of storage mediums. The processor 1405 may control a series of processes for the transmission apparatus 1401 to operate in accordance with the one or more embodiments disclosed herein. The processor 1405 may further include a controller or one or more processors in order to control the one or more operations performed by the BS 303 and the UE 301 as disclosed herein.

The transmission apparatus 1401 may be configured to detect an occurrence of a beam failure between the transmission apparatus 1401 and the receiving apparatus 1407 based on detection of a dynamic blocking of the at least one reference signal transmitted by the transmission apparatus 1401. The transmission apparatus 1401 may be further configured to identify, upon the detection of the occurrence of the beam failure, at least one RIS among the plurality of RIS for transmitting a at least one reference signal and may control the transmission apparatus to transmit the at least one reference signal to the at least one identified RIS. The transmission apparatus 1401 may receive, from the at least one identified RIS via the transceiver 1403, a receiver feedback for the at least one reference signal and may further generate an RIS candidate beam list based on the receiver feedback. Thereafter, transmission apparatus 1401 may transmit via the at least one identified RIS, the RRC message to the receiving apparatus 1407 after including the generated RIS candidate beam list in the RRC message as the beam failure recovery configuration.

Each of the one or more RIS 1413 may include an array of unit cells 1417 and an RIS controller 1415. Each of the unit cells 1417 in the array of unit cells 1417 may comprise identical, substantially identical, or substantially similar passive elements that are each configured to operate as a reflective element. The RIS controller 1415 may be configured to control one or more unit cells within the array of unit cells 1417 to vary phase and amplitude of the reference signals that are reflected from the corresponding RIS toward the receiving apparatus 1407.

The receiving apparatus 1407 may include a transceiver 1409 and a processor 1411. The transceiver 1409 may transmit or receive one or more signals to/from transmission apparatus and one or more RIS. The transceiver 1409 may receive the one or more signals on a wired channel or wireless channel and may provide the received signals to the processor 1411. The transceiver 1409 may be configured to transmit signal output from the processor 1405 on a wired channel or wireless channel. The receiving apparatus 1407 may also comprise a memory that may store a program and data required for the operation of the receiving apparatus 1407. Furthermore, the memory may store control information or data included in a signal obtained by the receiving apparatus 1407. The memory may include a storage medium such as, without limitation, a read-only memory (ROM), a random-access memory (RAM), a hard disk, a compact disc ROM (CD-ROM), and a digital versatile disc (DVD), or a combination of storage mediums. The processor 1411 may control a series of processes for the receiving apparatus 1407 to operate in accordance with the embodiments of the disclosure. The processor 1411 may include a controller or one or more processors.

The receiving apparatus 1407 may be configured to receive, from the transmission apparatus 1401, the RRC message including the beam failure recovery configuration that includes an RIS candidate beam list, a reference signal (RS) candidate beam list. The receiving apparatus 1407 may be further configured to determine whether the priority threshold value associated with one of the RIS candidate beam list or the RS beam list is present in the beam failure recovery configuration. Thereafter, the receiving apparatus 1407 may be configured to detect, when it is determined that the priority threshold value is present in the beam failure recovery configuration, whether a drop in the RSRP of the serving beam between the receiving apparatus 1407 and the transmission apparatus 1401 is greater than the priority threshold value. Thereafter, the receiving apparatus 1407 may be further configured to determine or check whether any candidate beam is left in the RIS candidate beam list when it is determined that the drop in the RSRP of the serving beam is greater than the priority threshold value. Thereafter, the receiving apparatus 1407 may be further configured to perform, when any candidate beam is left in the RIS candidate beam list, the RACH random access procedure by selecting the next available candidate beam from the RIS candidate beam list.

As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not necessarily limited to the manner described herein.

Moreover, the actions of any flow diagram need not be implemented in the order shown; nor do all of the acts necessarily need to be performed. Also, those acts that are not dependent on other acts may be performed in parallel with the other acts.

What is claimed is:

1. A method of beam failure recovery managed by a transmitter of a communication system, the method comprising:
   detecting a first occurrence of a beam failure between the transmitter and a receiver;
   based on the detection of the first occurrence of the beam failure, identifying at least one first reconfigurable intelligent surface (RIS) for transmitting at least one reference signal;
   transmitting the at least one reference signal to the at least one first RIS;
   receiving, from the at least one first RIS, a receiver feedback for the at least one reference signal;
   generating an RIS candidate beam list based on the receiver feedback; and
   transmitting, to the receiver via the at least one first RIS, a radio resource control(RRC) message including the RIS candidate beam list as a beam failure recovery configuration.

2. The method as claimed in claim 1, further comprising:
   setting an RIS configuration mode for the at least one first RIS for selection of weight parameters to cover an area of target receivers; and
   transmitting the set RIS configuration mode to the at least one first RIS.

3. The method as claimed in claim 2, wherein the weight parameters include parameters related to a reflection coefficient, a phase of the at least one reference signal, and an amplitude of the at least one reference signal, and
   wherein the RIS configuration mode includes values associated with each of the reflection coefficient, the phase, and the amplitude of the at least one reference signal in a desired direction at a desired angle.

4. The method as claimed in claim 1, wherein the receiver feedback is received in response to the transmitted at least one reference signal, and
   wherein each of the at least one reference signal and the RRC message are transmitted periodically at a predefined time interval, the predefined time interval being signaled to the receiver via RRC signaling.

5. The method as claimed in claim 1, further comprising:
   determining a priority threshold value based on a receiver position, the receiver feedback, a position of the at least one first RIS, a historical pattern of signal blockage, and priority threshold values that are previously determined by the transmitter,
   wherein the RRC message further includes the priority threshold value.

6. The method as claimed in claim 1, further comprising:
   detecting a second occurrence of a beam failure between the at least one first RIS and the receiver;
   based on the detection of the second occurrence of the beam failure:
   identifying at least one second RIS for transmitting the at least one reference signal, and
   changing an assigned priority of the generated RIS candidate beam list for beam failure recovery; and
   transmitting, based on the change in the assigned priority, the RRC message to the receiver via the at least one second RIS.

7. An apparatus for managing a beam failure recovery in a communication system, the apparatus comprising:
   a transmitter; and
   at least one processor,
   wherein the at least one processor is configured to:
   detect an occurrence of a beam failure between the transmitter and a receiver;
   based on the detection of the occurrence of the beam failure, identify at least one RIS for transmitting at least one reference signal;
   generate an RIS candidate beam list based on a candidate signal received from the at least one first RIS; and
   control the transmitter to transmit via the at least one identified RIS, a radio resource control (RRC) message to the receiver, the RRC message including the generated RIS candidate beam list as a beam failure recovery configuration.

8. The apparatus as claimed in claim 7, wherein each RIS includes an array of unit cells, and
   each of the unit cells in the array of unit cells comprises substantially identical passive elements.

9. The apparatus as claimed in claim 8, wherein each of the unit cells is configured to operate as a reflective element, and
   one or more unit cells are configured to be within the array of unit cells to vary phase and amplitude of signals that are reflected from the corresponding RIS toward the receiver.

* * * * *